United States Patent
Delaney et al.

(10) Patent No.: US 10,408,631 B2
(45) Date of Patent: Sep. 10, 2019

(54) JOURNEY PLANNING

(71) Applicant: International Business Machines Corporation, Armonk, NY (US)

(72) Inventors: John V. Delaney, Kildalkey (IE); Anthony M. Hunt, Hopewell Junction, NY (US); Philippe H. V. M. Spaas, Londerzeel (BE); Clea A. Zolotow, Key West, FL (US)

(73) Assignee: International Business Machines Corporation, Armonk, NY (US)

( * ) Notice: Subject to any disclaimer, the term of this patent is extended or adjusted under 35 U.S.C. 154(b) by 806 days.

(21) Appl. No.: 14/807,983

(22) Filed: Jul. 24, 2015

(65) Prior Publication Data

US 2017/0023370 A1    Jan. 26, 2017

(51) Int. Cl.
*G01C 21/34* (2006.01)

(52) U.S. Cl.
CPC ..... *G01C 21/3492* (2013.01); *G01C 21/3484* (2013.01)

(58) Field of Classification Search
None
See application file for complete search history.

(56) References Cited

U.S. PATENT DOCUMENTS

| | | | | |
|---|---|---|---|---|
| 7,606,662 | B2 * | 10/2009 | Tengler | G01C 21/3484 340/995.19 |
| 8,005,696 | B2 * | 8/2011 | de Marcken | G06Q 10/025 705/6 |
| 8,718,925 | B2 | 5/2014 | Letchner et al. | |
| 8,725,612 | B2 | 5/2014 | Mundinger et al. | |
| 9,008,960 | B2 | 4/2015 | Horvitz | |

(Continued)

FOREIGN PATENT DOCUMENTS

| | | |
|---|---|---|
| DE | 102011080490 A1 | 3/2012 |
| EP | 2742468 A1 | 6/2014 |

(Continued)

OTHER PUBLICATIONS

Betis et al.; "Multimodality for People and Goods: The Instant Mobility project"; Future Internet PPP; May 30, 2012; 25 pages.

(Continued)

*Primary Examiner* — Shelley Chen
(74) *Attorney, Agent, or Firm* — Andrew Aubert

(57) ABSTRACT

A computer-implemented method includes accessing a user database, accessing a transport database, and generating a global recommended travel plan. The user database includes travel preferences and a metric preference for each user. The travel preferences include an origin, and a destination. The transport database includes transport data. The global recommended travel plan includes, for each user, a recommended route from the user's origin to the user's destination, a recommended mode, and a recommended start time. Generating the global recommended travel plan includes simultaneously optimizing each user's metric preference based on the transport data and the travel preferences. The computer-implemented method further includes returning each user's recommended route, recommended mode, and recommended start time. A corresponding computer program product and computer system are also disclosed.

18 Claims, 6 Drawing Sheets

(56) References Cited

U.S. PATENT DOCUMENTS

| | | | |
|---|---|---|---|
| 9,212,925 B2* | 12/2015 | Bell | G01C 21/3492 |
| 9,446,766 B2* | 9/2016 | Tanaka | B60W 10/06 |
| 9,984,574 B2* | 5/2018 | Laetz | G08G 1/202 |
| 2007/0276595 A1* | 11/2007 | Lewinson | G01C 21/3438 701/533 |
| 2008/0094250 A1* | 4/2008 | Myr | G08G 1/04 340/909 |
| 2010/0268673 A1 | 10/2010 | Quadracci | |
| 2010/0280748 A1 | 11/2010 | Mundinger et al. | |
| 2011/0022425 A1 | 1/2011 | Block et al. | |
| 2011/0178702 A1 | 7/2011 | Lassesson et al. | |
| 2013/0046456 A1 | 2/2013 | Scofield et al. | |
| 2013/0197789 A1 | 8/2013 | Bhadkaria et al. | |
| 2014/0073362 A1* | 3/2014 | Kawata | G06Q 10/10 455/456.3 |
| 2014/0118168 A1 | 5/2014 | Lee et al. | |
| 2014/0229102 A1 | 8/2014 | Bapna et al. | |
| 2014/0236464 A1* | 8/2014 | Gueziec | G08G 1/0112 701/117 |
| 2014/0250122 A1 | 9/2014 | Fredericks et al. | |
| 2014/0351037 A1 | 11/2014 | Shaam et al. | |
| 2014/0358435 A1* | 12/2014 | Bell | G01C 21/3492 701/527 |
| 2015/0081597 A1 | 3/2015 | Chang et al. | |
| 2015/0095198 A1 | 4/2015 | Eramian | |
| 2015/0230061 A1* | 8/2015 | Srivastava | H04W 4/043 705/324 |
| 2015/0360688 A1* | 12/2015 | Tanaka | B60W 10/06 701/93 |
| 2016/0203422 A1* | 7/2016 | Demarchi | G06Q 10/025 705/6 |

FOREIGN PATENT DOCUMENTS

| | | |
|---|---|---|
| EP | 2217880 B1 | 2/2015 |
| JP | 2013134113 A * | 7/2013 |
| WO | 2006000208 A1 | 1/2006 |

OTHER PUBLICATIONS

Botea et al.; "Multi-Modal Journey Planning in the Presence of Uncertainty"; Proceedings of the Twenty-Third International Conference on Automated Planning and Scheduling; Copyright © 2013, Association for the Advancement of Artificial Intelligence; pp. 20-28.

Delling et al.; "Computing Multimodal Journeys in Practice"; © Springer-Verlag Berlin Heidelberg 2013; pp. 1-12; <http://www.cs.princeton.edu/~rwerneck/papers/DDPWW13-multimodal.pdf>.

Rafidi et al.; "Real-time Trip Planning with the Crowd"; CHI 2013 Extended Abstracts; Apr. 27-May 2, 2013; Paris, France; ACM; Copyright is held by the author/owner(s); pp. 1-6.

"Key Findings"; INRIX; Printed on: Jun. 8, 2015; © 2014 INRIX, Inc. ; pp. 1-5; <http://inrix.com/scorecard/key-findings-us/>.

"Method for Travel Plan based on Social Network Contribution and Sentiment Analysis"; An IP.com Prior Art Database Technical Disclosure; IP.com Electronic Publication: Nov. 13, 2014; IP.com No. 000239535; pp. 1-4.

"Smarter Transportation Management"; IBM; Printed on: Jun. 8, 2015; pp. 1-4; <http://w3-03.ibm.com/software/spcn/content/E170034M73761I23.html>.

"TomTom-Car-Get there faster"; TomTom; Printed on: Jun. 8, 2015; Copyright © 2015, TomTom International BV.; pp. 1-8; <http://www.tomtom.com/en_gb/drive/car/index.html?WT.Click_Link=top>.

"Twitraffic (@twitraffic_)"; Twitter; Printed on: Jun. 8, 2015; p. 1; <https://twitter.com/twitraffic_>.

"Urban Transport"; Asian Development Bank; Printed on: Jul. 23, 2015; © 2015, Asian Development Bank; pp. 1-2; <http://www.adb.org/sectors/transport/key-priorities/urban-transport>.

"Chicago, IL, 60657 to Chicago, IL, 60602—Google Maps"; Generated Jun. 25, 2015; <https://www.google.com/maps/dir/Chicago,+IL+60657/Chicago,+IL+60602/@41.9115306,-87.6706466,13z/data=!3m1!4b1!4m13!4m12!1m5!1m1!1s0x880fd3ab6af5bf65:0xfa0b701b1c44285a!2m2!1d-87.6531805!2d41.9403795!1m5!1m1!1s0x880e2ca521e84edf:0xecda52e12beafd59!2m2!1d-87.6291268!2d41.8834728>.

* cited by examiner

JOURNEY PLANNING

BACKGROUND

The present invention relates generally to journey planning and in particular to journey planning within a travel space. Aspects of the present invention may fall within the technical field of route planning, including employing special cost functions and real-time or historical speed or traffic data.

Journey planning systems have seen increased use in recent years. Such systems may rely on various sources of transport data on a given transport space. Even as more and better transport data become available to journey planning systems, and as such systems have become more sophisticated, travelers continue to face difficulties with efficiency, and comfort.

SUMMARY

According to an aspect of the invention, a computer-implemented method includes accessing a user database, accessing a transport database, and generating a global recommended travel plan. The user database includes travel preferences and a metric preference for each user. The travel preferences include an origin and a destination. The transport database includes transport data. The global recommended travel plan includes, for each user, a recommended route from the user's origin to the user's destination, a recommended mode, and a recommended start time. Generating the global recommended travel plan includes simultaneously optimizing each user's metric preference based on the transport data and the travel preferences. The computer-implemented method further includes returning each user's recommended route, recommended mode, and recommended start time. A corresponding computer program product and computer system are also disclosed. This aspect of the invention advances the art by according, for the global recommended travel plan, how each user's travel plans affect and are affected by other users' travel plans.

Optionally, the recommended mode includes at least two alternative modes. This aspect of the invention advances the art by identifying a recommended mode.

Optionally, the travel preferences further include a mode preference. This aspect of the invention advances the art by incorporating the user's explicitly preferred method of travel.

Optionally, all users are members of an organization, and the transport data include data that is internal to the organization that is aggregated from the organization's internal electronic publication data, internal social media message data, or internal person-to-person message data. This aspect of the invention advances the art by applying specialized organizational data to journey planning.

Optionally, each user is provided a choice of metric preferences that includes environmental impact, the productive time, or safety. This aspect of the invention advances the art by providing different valuation solutions for journey planning.

Optionally, the transport data include data aggregated from: (a) distributively reported traffic data; (b) centrally reported traffic data; (c) distributively reported weather data; (d) centrally reported weather data; (e) modal policy data; (f) modal news data; (g) modal statistical data; (h) general news data; and (i) public social media message data. This aspect of the invention advances the art by providing a distinctive conjunction of data sources sufficient for macro analysis of a given travel space.

DETAILED DESCRIPTION

Figure 1:
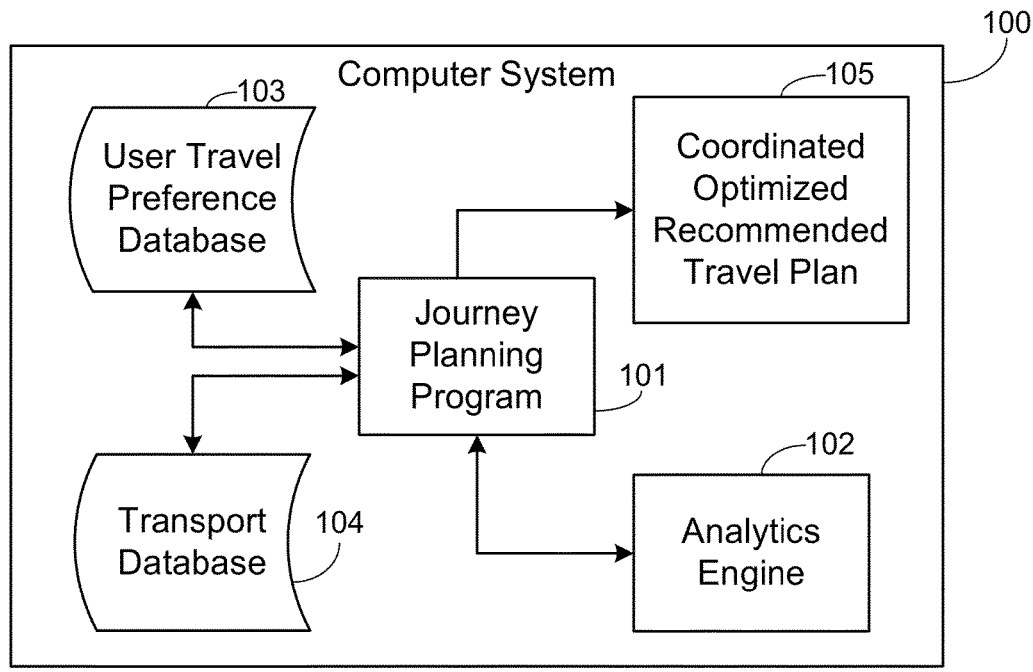
FIG. 1 is a block diagram of one embodiment of a computer system environment suitable for operation in accordance with at least one embodiment of the invention.

Referring now to various embodiments of the invention in more detail, FIG. 1 is a block diagram of one embodiment of a computer system environment suitable for operation of the invention. Within a computer system 100, a journey planning program 101 may access data from a user travel preference database 103 and a transport database 104. The journey planning program 101 may present data to an analytics engine 102, receive results from the analytics engine 102, and generate a coordinated optimized recommended travel plan 105.

Figure 2:
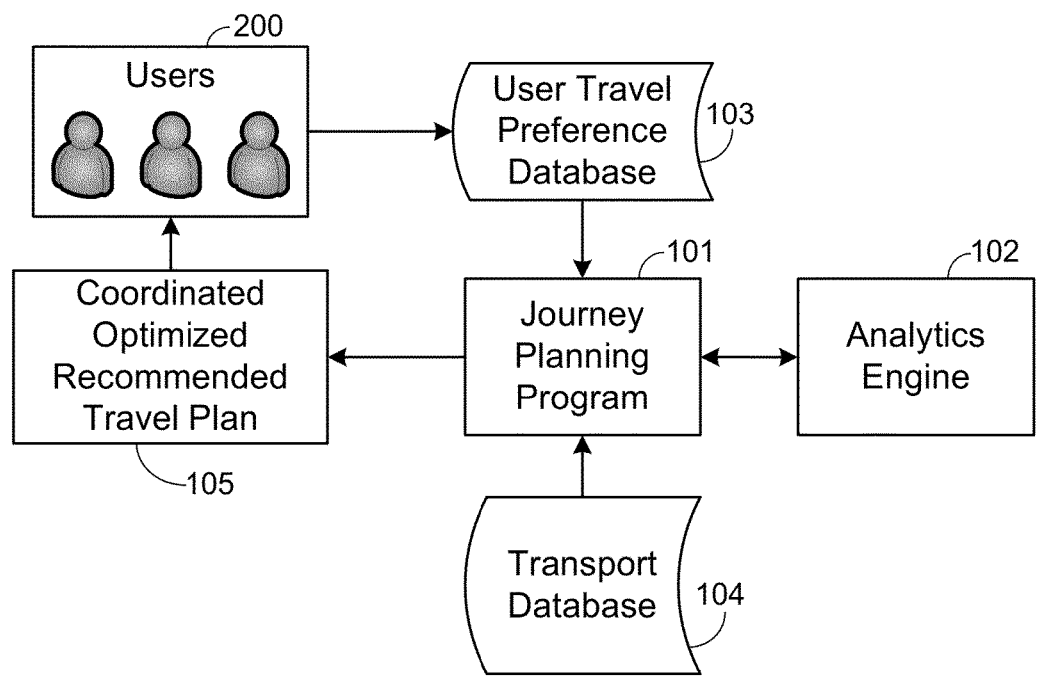
FIG. 2 is a block diagram of an operational environment in accordance with at least one embodiment of the invention.

FIG. 2 presents a block diagram of various logical components according to one embodiment of the invention, displaying the journey planning program 101, which is in communication with the analytics engine 102 and the transport database 104. In the depicted embodiment, the journey planning program 101 further receives information from the user travel preference database 103 and outputs the coordinated optimized recommended travel plan 105. The coordinated optimized recommended travel plan 105 may be presented to a group of users 200, who in turn submit their individual travel preferences to the user travel preference database 103.

Figure 3:
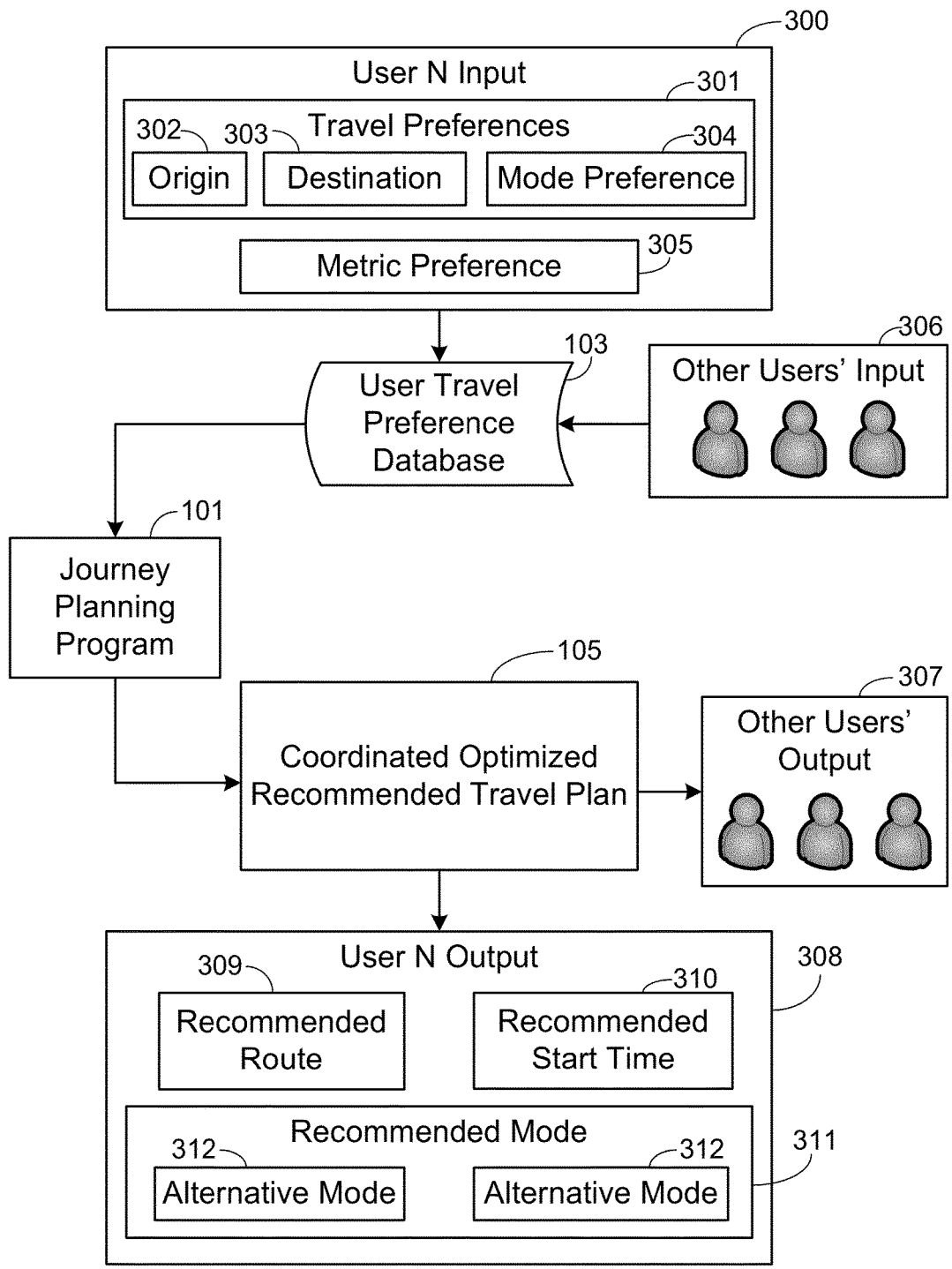
FIG. 3 is a data flow diagram in accordance with at least one embodiment of the invention.

FIG. 3 presents the flow of various data elements according to one embodiment of the invention. In the embodiment depicted in FIG. 3, a given User N has associated with them a set of input data, the User N Input 300. In the depicted embodiment, the User N Input is structured identically with and serves as an example for all other users' input 306. In the depicted embodiment, the User N Input 300 is combined with the other users' input 306 in the user travel preference database 103. The User N Input 300 may include several data elements specific to User N: the travel preferences 301, including the origin 302 and destination 303 of User N's journey, and User N's mode preference 304 (e.g. car, bike, walking, train). Separately from the travel preferences 301, User N's metric preference 305 may be understood as part of the User N input 301.

The metric preference 305 may be any attribute of the journey that the user 200 wishes to maximize. For example, the user 200 may prefer shortest time or the least money cost. Users 200 may be provided with a selection of metric choices from which to select one or more preferred metrics. One possible metric is minimizing the environmental impact of the journey. For example, the user may prefer to minimize their emitted carbon dioxide, and thus bicycling, having zero emissions, may be recommended in good conditions, but walking may be recommended where cycling is impossible due to snow on the ground or, if a motor vehicle must be recommended, then a natural gas fueled bus may be recommended over a private car because it involve lower emissions per traveler.

Another possible metric is the productive time of the journey. Users 200 may be able to accomplish tasks where there is non-engaged time on a bus or train, or waiting for a bus or train. By contrast, driving a car or riding a bicycle takes the user 200's full attention, and thus these are less productive choices. Additionally, safety may be another possible metric. A user who normally drives may benefit from switching to a professionally driven bus or taxi during severe weather or traffic conditions. Similarly, a user who normally walks or cycles may be routed away, at the cost of time, from an intersection or rail crossing having a high accident rate.

In general, embodiments of the invention provide the users 200 with several choices or combinations of choices for the metric preference 305. Particularly, the choice of metric preference may include at least one metric selected from the group consisting of (i) environmental impact, (ii) productive time, and (iii) safety. The metric preferences 305 may be simultaneously optimized for all users 200 at runtime, as opposed to being pre-selected by the system or selectable by the user only as a filter of already-determined results. Especially where the user 200 is given a choice of metric preferences 305 that includes at least one of environmental impact, productive time, or safety, this aspect of the invention has the advantage of providing users with journey recommendations that are valuable on their own chosen terms.

In some embodiments, the metric preferences 305 are not presented as explicit choices to be input by the users 200. In such cases, the metric preferences may be inferred from user behavior, or may be set at the system level for some or all users at the time of implementation. Where, as in the embodiment of FIG. 6, an organization 600 practices the invention, the organization 600 may select the metric preferences for all users. Similarly, the choice of metric preferences may be made initially for users by the selection of reasonable defaults. In general, the metric preferences 305 may be regarded as existing equivalently, regardless of how they are set, or by whom, and even if they are the same for all users.

Referring still to the embodiment depicted in FIG. 3, the journey planning program 101 uses the combined user travel preferences database 103, structured as shown for the User N Input 300, to generate the coordinated optimized recommended travel plan 105. The coordinated optimized recommended travel plan 105 may be understood as aggregate output for all users of the system, including the User N Output 308 and all other users' output 307, which may be structured in the same manner as the User N Output 308, as depicted. The User N Output 308 may include a recommended route 309, a recommended start time 310, and a recommended mode 311. Optionally, the recommended mode 311 may include at least two alternative modes 312; an embodiment in which at least two or more alternative modes 312 are provided has the advantage of giving the user modal choices that a user may take seriously as relevant to the user's stated metric preference 305.

Referring now to the embodiments depicted in FIGS. 1-3, the operational environment of the invention may include a plurality of users 200, each of which has a future journey, as represented by the arbitrary user N's origin 302 and destination 303. The several user's 200 need not share any common journey characteristics—the users 200 may all have different origins, destinations, and preferences. However, in one conceptualization, the users 200 may be understood to share a travel space. A travel space may be understood to encompass one or more stated geographies, time periods, and/or modal systems of transport, in which the users 200 wish to travel and to which the journey planning program 101 is to be applied. Accordingly, each user's origin and destination may be understood to each include location and/or time information such that "depart at" or "arrive by" requirements are reflected in the data.

For example, one travel space may consider daily commuting in a major urban area. In such a travel space, the geography may be defined as the urban area and its surrounding region, the time period may be defined as a morning commute period (e.g. 5:00 AM-10:00 AM), and the modal systems may be defined to include car, bus, bicycle, walking, train, and so forth. The modal systems may be further divided according to what exists in the particular urban area. For example, car transport may be divided into private user-owned cars, taxis, carpool schemes, and/or vehicle sharing schemes such as ZIPCAR®. Similarly, bicycle transport may be divided between user-owned bicycles and bicycle sharing schemes such as DIVVY®, and train transport may distinguish between commuter rail, light rail, subway/metro, intercity rail, high speed rail, and so forth.

Embodiments of the invention may be applied to widely varying travel spaces. Additional examples include regional, national, or international transport routes over time frames of days or weeks. Similarly, a travel space may be defined narrowly, for example in a busy work facility or airport over time frames of hours or fractions of hours. In still other embodiments, users need not be human travelers, but may be livestock, cargo, data packets, or generally any unit that may be moved on a journey within a travel space.

Referring still to the embodiments depicted in FIGS. 1-3, analytics engine 102 may be a general purpose analytics engine or may operate on a model tailored to transport systems. The analytics engine 102 may be configured for finding patterns and efficiencies in at the macro level, understood in the context of the particular travel space. For example, in a metropolitan area, the analytics engine may consider levels of congestion on particular roads, but may be configured to abstract over individual vehicles moving through intersections.

Figure 5:
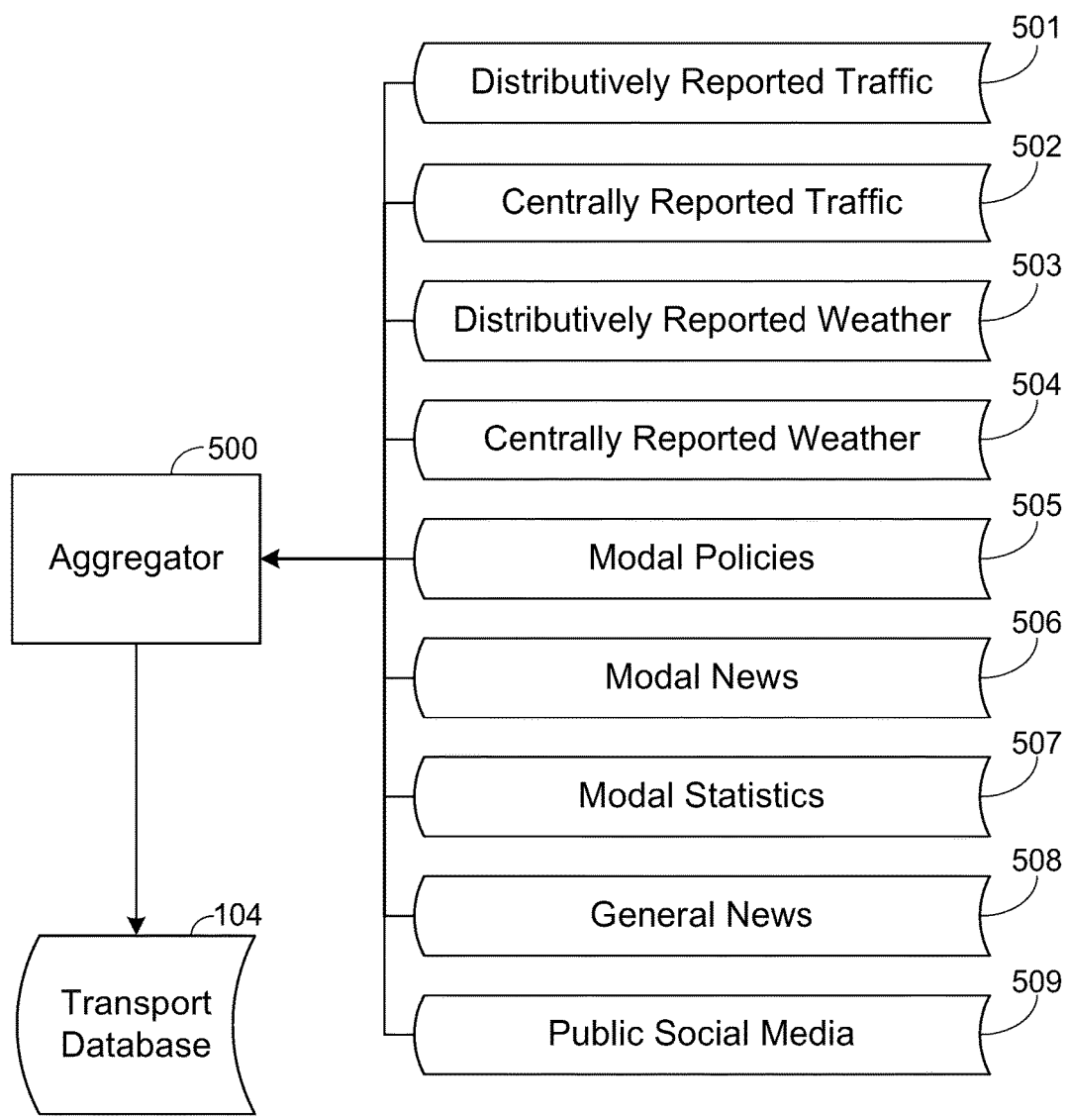
FIG. 5 is a data flow diagram showing various data sources in accordance with at least one embodiment of the invention.

In addition to the preferences of the several users 200 as recorded in the user travel preference database 103, the journey planning program 101 may present to the analytics engine data on the various modes of transport within the travel space as may be stored in the transport database 104. FIG. 5, described in detail below, identifies various exemplary sources of transport data suitable for macro analytics, according to various aspects of the present invention.

Figure 4:
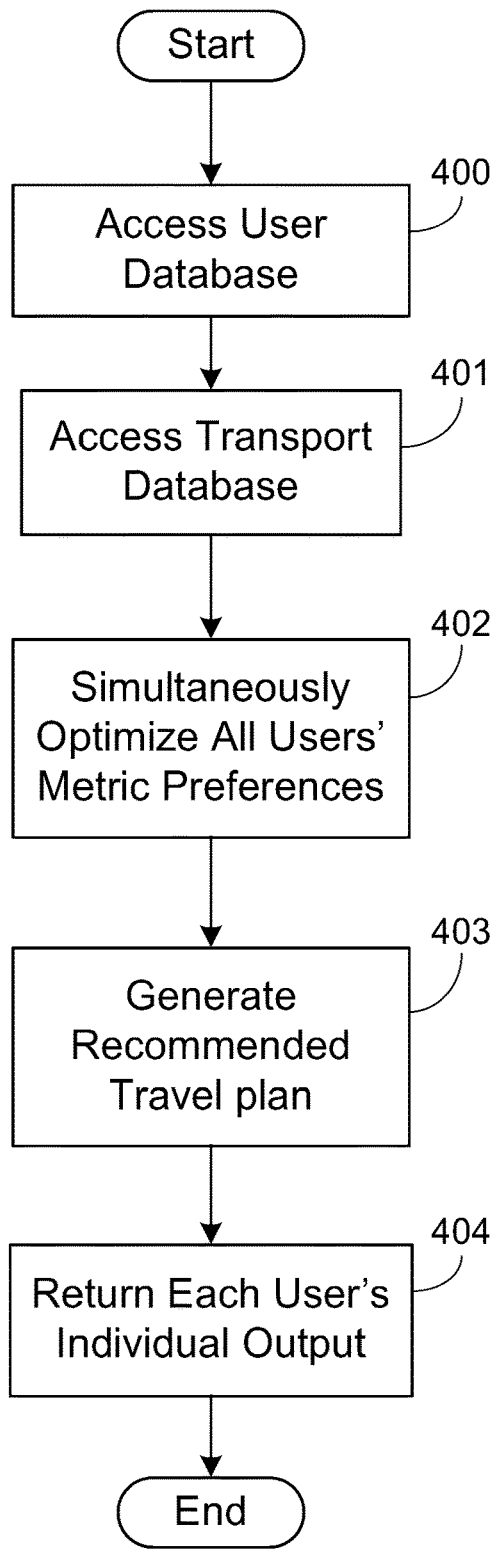
FIG. 4 is a flow chart diagram of a method for the journey planning program in accordance with at least one embodiment of the invention.

Referring now to the flow chart diagram of FIG. 4, FIG. 4 describes one embodiment of the journey planning program 101. According to the depicted embodiment, at step 400, the journey planning program 101 accesses a user database such as the user travel preference database 103. The user database may include travel preferences 301 and a metric preference 305 for each user, as described above. The travel preferences 301 may include the mode preference 304, the origin 302, and the destination 303. At step 401, the journey planning program may access a transport database such as the transport database 104, which includes transport data, as described above.

At step 402, the journey planning program 101 may simultaneously optimize all users' metric preferences 305, based on the transport data and the travel preferences 301. The transport data may be presented to the analytics engine 102. Internally, the analytics engine may generate a prediction or model of travel processes within the transport space, which may include speeds and congestion levels at different times. The journey planning program 101 may further present possible routes on various modes for the various users to the analytics engine 102, which may in turn update the prediction and/or model to account for the effect of possible user routes through the system. The analytics engine 102 may continue to try possible routes and modes for various users until a good or best solution is reached. A best solution may be a prediction or model where the most users' preferred metrics are maximized to the greatest extent possible. A good solution may be understood as a solution that does well compared to other models, but is not necessarily or not provably the best solution.

Referring still to the embodiment depicted in FIG. 4, the journey planning program 101 generates a recommended travel plan at step 403. The recommended travel plan may be structured along the lines of the coordinated optimized recommended travel plan 105, described above. The recommended travel plan may include, for each user 200, the recommended route 309 from the user's origin 302 to the user's destination 303, the recommended mode 311, and the recommended start time 310.

Where the journey planning program 101 presents possible user routes and modes to the analytics engine 102, operation of the invention may be affected by the proportion of travelers within the transport space that are users of the system. In embodiments where the users 200 represent a large fraction of travelers in the transport space, there may be observable changes in overall traffic and/or usage patterns within the transport space because of users 200 behaving according to the system's recommendations. Thus, embodiments of the invention have the advantage of being able to not only plan around traffic, but also to actively reduce congestion. Even where users 200 do not make up a large fraction of the travelers in the transport space, embodiments of the invention still perform macro analytics-based guidance by which users 200 may maximize their preferred metrics in the travel space.

At step 404, each user 200's individual output may be returned. The individual output may include the user 200's recommended route 309, recommended mode 311, and recommended start time 310. The output may be delivered to each user 200 via any electronic transmission means, including email, test message, mobile app, or browser app. The delivery system may be incorporated with a system for monitoring whether users actually follow the recommended route 309; such a system may track the route taken by each user 200 via the user 200's Global Positioning System (GPS) enabled mobile device, or such a system may collect survey data from the users 200 asking whether they followed the recommendation or not. Data on rates of users 200 following the system's recommendations may be fed back into the transport database 104.

Referring now to FIG. 5, FIG. 5 displays some possible data sources that may be included in the transport database 104. The data sources may vary in terms of structure, volume, reliability, relevance, and interpretation for journey planning. In general, an aggregator 500 may be configured for parsing and transforming disparate data into a form that is useful to the analytics engine 102. Output from the aggregator 500 may be placed in the transport database 104 where it may be available to the journey planning program 101 and analytics engine 102.

Included in the various data sources are distributively reported traffic data 501 and centrally reported traffic data 502. Traffic data may include data on the movements, flows, and patterns of vehicles, pedestrians, or other units moving through a travel space. Distributively reported traffic data 501 may include traffic data that are aggregated from in-vehicle navigation devices such as GPS-enabled smart phones and dashboard GPS navigation devices. Centrally reported traffic data 502 may include observations of traffic patterns as reported by news organizations, as well as public announcements that affect traffic, such as road closures and construction plans.

Included in the various data sources are distributively reported weather data 503 and centrally reported weather data 504. Distributively reported weather data 503 may include data aggregated from fixed or mobile weather stations or sensors as well as weather-related data parsed from publicly available social media. Centrally reported weather data 504 may include weather reports and forecasts published by news organizations.

Included in the various data sources may be modal policy data 505, modal news data 506, and modal statistical data 507. Modal data may include data specifically affecting particular modes of transport. Modal policy data 505 may include transit schedules, fares, and rules as well as policy data for car or bicycle sharing schemes, for example when bikes/cars are available, pricing, who may rent/borrow and for how long. Modal news data 506 may include published notices by the transport operator, e.g. construction delays on a rail line. Modal statistical data 507 may include on-time frequencies, real-time or historical tracking, and real-time or historical availability.

Included in the various data sources may be general news data 508 and public social media data 509. General news data 508 may include reports from news organizations. Public social media data 509 may include aggregated and parsed messages posted to publically accessible social media outlets, as well as statistical information or metadata about social media messages.

The conjunction of data aggregated from all of the various data sources 501-509 to be included in the transport database 104 for presentment to the analytics engine 102 makes possible macro analytic at the level of traffic flow, timings, and congestion patterns. This aspect is a specific advantage over systems that rely on a more limited data set, regardless of the analysis used.

Figure 6:
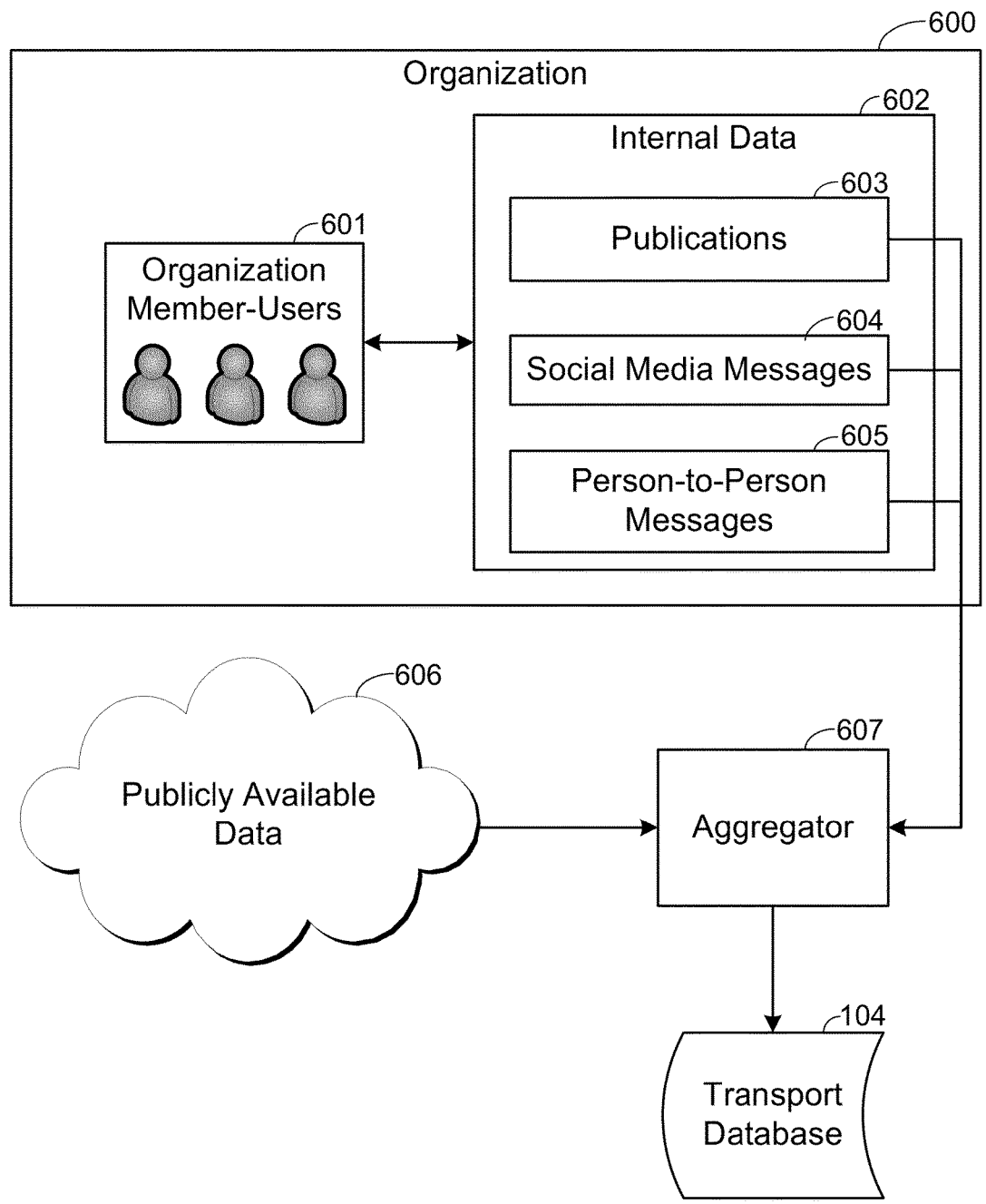
FIG. 6 is a data flow diagram showing various logical and data elements in an organizational environment in accordance with at least one embodiment of the invention.

Referring now to FIG. 6, a group of member-users 601 are both members of an organization 600 and users of a system embodying the invention. The member-users 601 may be at least some of a broader group of users 200. In the depicted embodiment the organization makes available one or more sources of internal data 602 to include in the transport database 104. An aggregator 607 may aggregate and parse the internal data 602 together with publicly available 606 of the kind discussed above. The internal data 602 may be selected from the group consisting of: (i) the organization 600's internal publication data 603, (ii) internal social media message data 604, and (iii) internal person-to-person message data 605. Internal publication data 603 may include intranet web pages, announcements, and policy manuals. Internal social media message data 604 may include information shared on internal social media tools such as IBM Connections. Internal person-to-person message data 605 may include information from member email and organizational instant message systems such as IBM® Sametime®. Where person-to-person messages are parsed and aggregated, controls may be applied to protect information security, confidentiality, legal privilege, etc.

Embodiments where an organization 600 provides its internal data to the transport database have the advantage that it is possible to identify events within the organization 600 that have an effect on the transport space. In a transport space where the organization 600's member-users 601 make up a large fraction of the travelers internal events and member-users' 601 behavior in response to internal events can affect over all patterns in the transit space.

Figure 7:
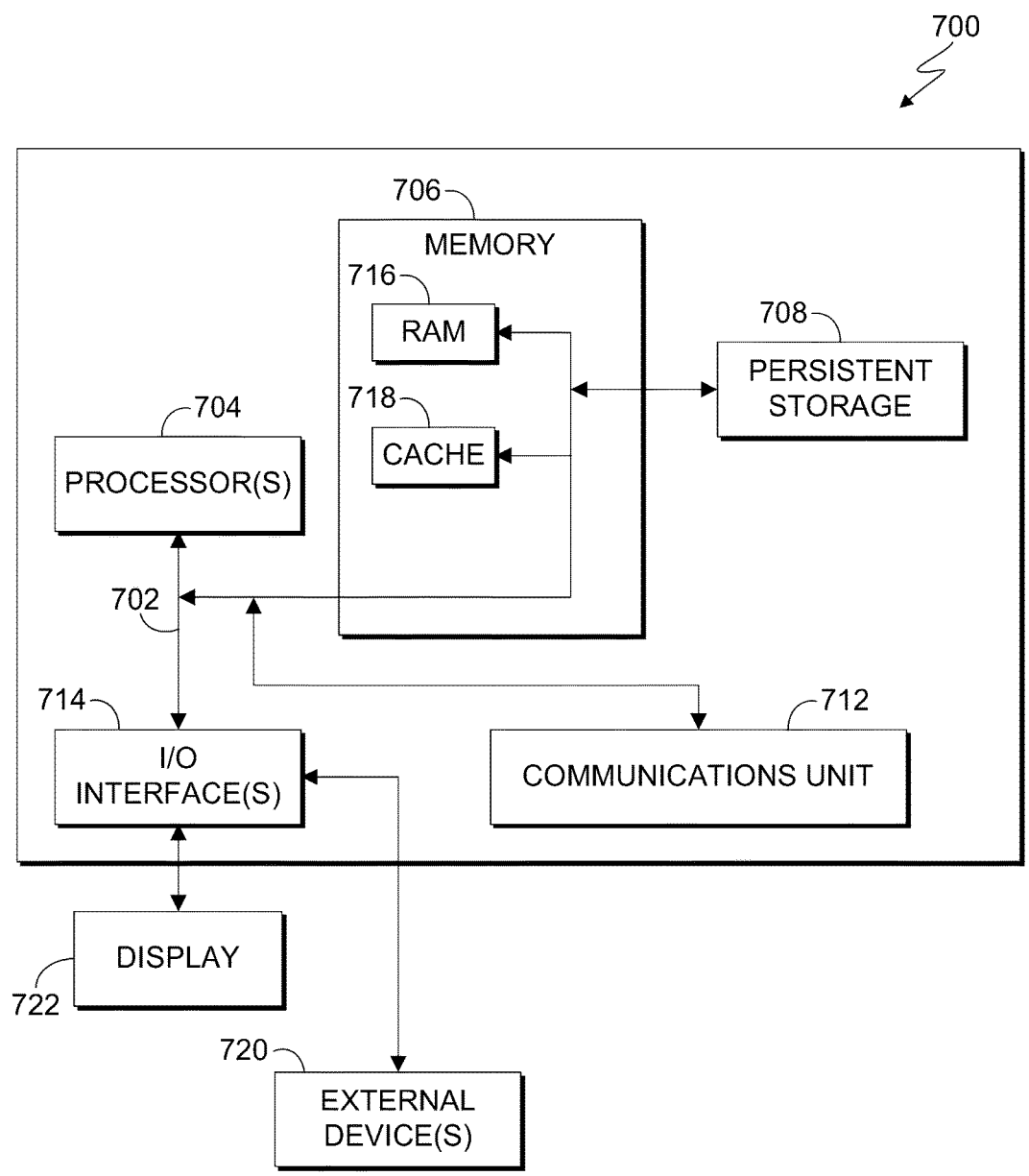
FIG. 7 is a block diagram of a computing apparatus 700 suitable for executing the journey planning program in accordance with at least one embodiment of the invention.

FIG. 7 is a block diagram depicting components of a computer 700 suitable for executing the journey planning program 101. FIG. 7 displays the computer 700, the one or more processor(s) 704 (including one or more computer processors), the communications fabric 702, the memory 706, the RAM 716, the cache 718, the persistent storage 708, the communications unit 712, the I/O interfaces 714, the display 722, and the external devices 720. It should be appreciated that FIG. 7 provides only an illustration of one embodiment and does not imply any limitations with regard to the environments in which different embodiments may be implemented. Many modifications to the depicted environment may be made.

As depicted, the computer 700 operates over a communications fabric 702, which provides communications between the computer processor(s) 704, memory 706, persistent storage 708, communications unit 712, and input/output (I/O) interface(s) 714. The communications fabric 702 may be implemented with any architecture suitable for passing data or control information between the processors 704 (e.g. microprocessors, communications processors, and network processors), the memory 706, the external devices 720, and any other hardware components within a system. For example, the communications fabric 702 may be implemented with one or more buses.

The memory 706 and persistent storage 708 are computer readable storage media. In the depicted embodiment, the memory 706 comprises a random access memory (RAM) 716 and a cache 718. In general, the memory 706 may comprise any suitable volatile or non-volatile one or more computer readable storage media.

Program instructions for the journey planning program 101 may be stored in the persistent storage 708, or more generally, any computer readable storage media, for execution by one or more of the respective computer processors 704 via one or more memories of the memory 706. The persistent storage 708 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of the persistent storage 708.

The communications unit 712, in these examples, provides for communications with other data processing systems or devices. In these examples, the communications unit 712 may comprise one or more network interface cards. The communications unit 712 may provide communications through the use of either or both physical and wireless communications links. In the context of some embodiments of the present invention, the source of the user travel preference database 103 and the transport database 104 may be physically remote to the computer 700 and accessed via the communications unit 712.

The I/O interface(s) 714 allow for input and output of data with other devices that may operate in conjunction with the computer 700. For example, the I/O interface 714 may provide a connection to the external devices 720, which may be as a keyboard, keypad, a touch screen, or other suitable input devices. External devices 720 may also include portable computer readable storage media, for example thumb drives, portable optical or magnetic disks, and memory cards. Software and data used to practice embodiments of the present invention may be stored on such portable computer readable storage media and may be loaded onto the persistent storage 708 via the I/O interface(s) 714. The I/O interface(s) 714 may similarly connect to a display 722. The display 722 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method (CIM) comprising:
receiving a plurality of metric preferences for a first user, including at least a first metric preference, where the first metric preference is productive time of a given journey, and productive time is time where the first user can accomplish other tasks while in transit;
receiving a plurality of metric preferences for a second user, including at least a second metric preference, where the second metric preference is safety during transit;
accessing a user database, where the user database comprises travel preferences for a plurality of users, including at least the first user and the second user, where the travel preferences comprise an origin and a destination;
accessing a transport database, where the transport database comprises transport data;
optimizing the plurality of metric preferences of the first user based, at least in part, on: (i) the transport data, (ii) the travel preferences of each other user of the plurality of users, and (iii) the plurality of metric preferences of the second user;
generating a first user recommended travel plan based, at least in part, on the travel preferences respectively correlated to the first user and the optimized plurality of metric preferences of the first user, where the first user recommended travel plan includes, a recommended route, a recommended mode, and a recommended start time; and
returning the first user recommended travel plan to the first user.

2. The computer-implemented method of claim 1, wherein:

the travel preferences for the plurality of users further includes a preferred mode of transport for each user, including at least the first user and the second user; and the preferred mode of transport of the second user is a bicycle.

3. The computer-implemented method of claim 2, further comprising:

optimizing the plurality of metric preferences of the second user based, at least in part, on: (i) the transport data, (ii) the travel preferences of each other user of the plurality of users, and (iii) the plurality of metric preferences of the first user; and generating a second user recommended travel plan based, at least in part, on the travel preferences respectively correlated to the second user and the optimized plurality of metrics of the second user, where the metric preference of safety during transit adjusts the recommended travel plan to avoid intersections with above average bicycle accident rates.

4. The computer-implemented method of claim 1, wherein at least some users of the plurality of users are members of an organization, and wherein the transport data comprises data internal to the organization that is aggregated from any source selected from the group consisting of: (i) internal publication data, (ii) internal social media message data, and (iii) internal person-to-person message data.

5. The computer-implemented method of claim 1, wherein each given user of the plurality of users is presented each of the following three options to select at least one of the three options as a metric preference: (i) environmental impact, (ii) productive time, and (iii) safety.

6. The computer-implemented method of claim 1, wherein the transport data comprises data aggregated from: (i) distributively reported traffic data, (ii) centrally reported traffic data, (iii) distributively reported weather data, (iv) centrally reported weather data, (v) modal policy data, (vi) modal news data, (vii) modal statistical data, (viii) general news data, and (ix) public social media message data.

7. A computer system (CS), the CS comprising:

one or more computer processors;

one or more computer readable storage media;

computer program instructions stored on the one or more computer readable storage media, with the computer program instructions including instructions for causing the one or more computer processors to perform operations including the following:

receiving a plurality of metric preferences for a first user, including at least a first metric preference, where the first metric preference is productive time of a given journey, and productive time is time where the first user can accomplish other tasks while in transit, receiving a plurality of metric preferences for a second user, including at least a second metric preference, where the second metric preference is safety during transit, accessing a user database, where the user database comprises travel preferences for a plurality of users, including at least the first user and the second user, where the travel preferences comprise an origin and a destination, accessing a transport database, where the transport database includes transport data, optimizing the plurality of metric preferences of the first user based, at least in part, on: (i) the transport data, (ii) the travel preferences of each other user of the plurality of users, and (iii) the plurality of metric preferences of the second user, generating a first user recommended travel plan based, at least in part, on the travel preferences respectively correlated to the first user and the optimized plurality of metric preferences of the first user, where the first user recommended travel plan includes, a recommended route, a recommended mode, and a recommended start time, and returning the first user recommended travel plan.

8. The CS of claim 7, wherein:

the travel preferences for the plurality of users further includes a preferred mode of transport for each user, including at least the first user and the second user; and the preferred mode of transport of the second user is a bicycle.

9. The CS of claim 8, wherein the computer code further includes instructions for causing one or more computer processors to perform the following operations:

optimizing the plurality of metric preferences of the second user based, at least in part, on: (i) the transport data, (ii) the travel preferences of each other user of the plurality of users, and (iii) the plurality of metric preferences of the first user; and generating a second user recommended travel plan based, at least in part, on the travel preferences respectively correlated to the second user and the optimized plurality of metrics of the second user, where the metric preference of safety during transit adjusts the recommended travel plan to avoid intersections with above average bicycle accident rates.

10. The CS of claim 7, wherein at least some users of the plurality of users are members of an organization, and wherein the transport data comprises data internal to the organization that is aggregated from any source selected from the group consisting of: (i) internal publication data, (ii) internal social media message data, and (iii) internal person-to-person message data.

11. The CS of claim 7, wherein each given user of the plurality of users is presented each of the following three options to select at least one of the three options as a metric preference: (i) environmental impact, (ii) productive time, and (iii) safety.

12. The CS of claim 7, wherein the transport data comprises data aggregated from: (i) distributively reported traffic data, (ii) centrally reported traffic data, (iii) distributively reported weather data, (iv) centrally reported weather data, (v) modal policy data, (vi) modal news data, (vii) modal statistical data, (viii) general news data, and (ix) public social media message data.

13. A computer program product (CPP), the CPP comprising:

one or more computer readable storage media;

computer program instructions stored on the one or more computer readable storage media, with the computer program instructions including instructions for causing one or more computer processors to perform operations including the following:

receiving a plurality of metric preferences for a first user, including at least a first metric preference, where the first metric preference is productive time of a given journey, and productive time is time where the first user can accomplish other tasks while in transit, receiving a plurality of metric preferences for a second user, including at least a second metric preference, where the second metric preference is safety during transit, accessing a user database, where the user database comprises travel preferences for a plurality of users, including at least the first user and the second user, where the travel preferences comprise an origin and a destination, accessing a transport database, where the transport database includes transport data, optimizing the plurality of metric preferences of the first user based, at least in part, on: (i) the transport data, (ii) the travel preferences of each other user of the plurality of users, and (iii) the plurality of metric preferences of the second user, generating a first user recommended travel plan based, at least in part, on the travel preferences respectively correlated to the first user and the optimized plurality of metric preferences of the first user, where the first user recommended travel plan includes, a recommended route, a recommended mode, and a recommended start time, and returning the first user recommended travel plan.

14. The CPP of claim 13, wherein:

the travel preferences for the plurality of users further includes a preferred mode of transport for each user, including at least the first user and the second user; and the preferred mode of transport of the second user is a bicycle.

15. The CPP of claim 14, wherein the computer code further includes instructions for causing one or more computer processors to perform the following operations:

optimizing the plurality of metric preferences of the second user based, at least in part, on: (i) the transport data, (ii) the travel preferences of each other user of the plurality of users, and (iii) the plurality of metric preferences of the first user; and generating a second user recommended travel plan based, at least in part, on the travel preferences respectively correlated to the second user and the optimized plurality of metrics of the second user, where the metric preference of safety during transit adjusts the recommended travel plan to avoid intersections with above average bicycle accident rates.

16. The CPP of claim 13, wherein at least some users of the plurality of users are members of an organization, and wherein the transport data further includes data internal to the organization that is aggregated from any source selected from the group consisting of: (i) internal publication data, (ii) internal social media message data, and (iii) internal person-to-person message data.

17. The CPP of claim 13, wherein each given user of the plurality of users is presented each of the following three options to select at least one of the three options as a metric preference: (i) environmental impact, (ii) productive time, and (iii) safety.

18. The CPP of claim 13, wherein the transport data includes data aggregated from: (i) distributively reported traffic data, (ii) centrally reported traffic data, (iii) distributively reported weather data, (iv) centrally reported weather data, (v) modal policy data, (vi) modal news data, (vii) modal statistical data, (viii) general news data, and (ix) public social media message data.

* * * * *